(12) United States Patent
Leferink et al.

(10) Patent No.: US 11,317,636 B2
(45) Date of Patent: *May 3, 2022

(54) CLOSED PROCESSING SYSTEM AND METHOD FOR TREATING ELONGATED FOOD PRODUCTS

(71) Applicant: MAREL TOWNSEND FURTHER PROCESSING B.V., Boxmeer (NL)

(72) Inventors: Bernardus Wilhelmus Franciscus Leferink, Nijmegen (NL); Eric Henricus Johannes Aben, Ledeacker (NL); Hendrikus Cornelis Koos Van Doorn, Goch (DE); Johannes Martinus Meulendijks, Deurne (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 550 days.

This patent is subject to a terminal disclaimer.

(21) Appl. No.: 16/082,999

(22) PCT Filed: Mar. 8, 2017

(86) PCT No.: PCT/NL2017/050143
§ 371 (c)(1),
(2) Date: Sep. 7, 2018

(87) PCT Pub. No.: WO2017/155397
PCT Pub. Date: Sep. 14, 2017

(65) Prior Publication Data
US 2019/0110489 A1    Apr. 18, 2019

(30) Foreign Application Priority Data
Mar. 8, 2016  (NL) ...................... 2016385

(51) Int. Cl.
A23B 4/005    (2006.01)
A23L 3/40    (2006.01)
A23B 4/03    (2006.01)

(52) U.S. Cl.
CPC .............. *A23B 4/0056* (2013.01); *A23B 4/03* (2013.01); *A23B 4/031* (2013.01); *A23L 3/40* (2013.01)

(58) Field of Classification Search
CPC ......... A23B 4/0056; A23B 4/03; A23B 4/031; A23L 3/40
USPC ........................ 99/443 C, 474, 475, 479, 325
See application file for complete search history.

(56) References Cited

U.S. PATENT DOCUMENTS

| | | | | |
|---|---|---|---|---|
| 3,348,659 A | * | 10/1967 | Roinestad | F25D 13/067 198/778 |
| 3,412,476 A | * | 11/1968 | Astrom | A23L 3/361 34/147 |
| 3,889,009 A | * | 6/1975 | Lipoma | A23L 3/185 426/234 |
| 3,943,841 A | | 3/1976 | Huang | |
| 4,191,881 A | * | 3/1980 | Ahlgren | A21D 8/06 219/388 |
| 4,409,454 A | * | 10/1983 | Beauvais | A23L 3/01 219/431 |
| 4,944,162 A | * | 7/1990 | Lang | B65G 17/062 198/831 |
| 4,997,365 A | * | 3/1991 | Lanham | A21B 1/48 198/778 |
| 5,010,808 A | * | 4/1991 | Lanham | A21B 1/48 198/778 |
| 5,078,120 A | * | 1/1992 | Hwang | A21B 1/26 126/21 A |
| 5,189,948 A | * | 3/1993 | Liebermann | A47J 27/18 134/131 |
| 5,228,557 A | * | 7/1993 | Lago | B65G 21/18 198/778 |
| 5,243,962 A | * | 9/1993 | Hwang | A21B 1/26 126/21 A |
| 5,329,916 A | * | 7/1994 | Lygum | A21B 1/48 126/20.1 |
| 5,447,223 A | * | 9/1995 | Dasgupta | B23Q 41/02 198/778 |
| 5,615,603 A | * | 4/1997 | Polin | A21B 1/26 126/21 A |
| 5,836,240 A | * | 11/1998 | Kuenen | A21B 1/40 99/443 C |

(Continued)

FOREIGN PATENT DOCUMENTS

| | | |
|---|---|---|
| WO | 2006049492 A1 | 5/2006 |
| WO | 2007032679 A1 | 3/2007 |
| WO | 2014066133 A1 | 5/2014 |

OTHER PUBLICATIONS

Netherlands Search Report from Application No. NL 2016385, dated Jun. 17, 2016.

(Continued)

*Primary Examiner* — Jimmy Chou
(74) *Attorney, Agent, or Firm* — Workman Nydegger

(57) ABSTRACT

The present invention relates to a closed processing system for treating elongated food products comprising a housing bounding a process space, a transport path for displacing the elongated food products through the process space, at least one airflow generator for generating an airflow in the process space, at least one airflow conditioner for conditioning the generated airflow, and at least one detector for detecting process conditions in the process space, wherein the detected process conditions include at least the relative humidity and wherein the system is arranged to control the process conditions by adjusting the at least one airflow generator and/or at least one airflow conditioner based on the detected relative humidity. The present invention further relates to a method for treating elongated food products.

12 Claims, No Drawings

(56) References Cited

U.S. PATENT DOCUMENTS

| | | | | |
|---|---|---|---|---|
| 5,850,781 A * | 12/1998 | Kuenen | A21B 1/48 | 99/443 C |
| 6,095,805 A * | 8/2000 | Kuenen | A21B 1/48 | 432/144 |
| 6,138,660 A * | 10/2000 | Middleton, Jr. | A21B 1/26 | 126/21 A |
| 6,244,168 B1 * | 6/2001 | van de Vorst | A21B 1/48 | 99/443 C |
| 6,247,922 B1 * | 6/2001 | Kuenen | A21B 1/48 | 432/143 |
| 6,394,261 B1 * | 5/2002 | DeGennaro | B65G 21/18 | 198/778 |
| 6,976,369 B2 * | 12/2005 | Nothum, Jr. | A23L 3/361 | 62/380 |
| 7,331,445 B2 * | 2/2008 | Roland | B65G 21/18 | 198/778 |
| 7,374,035 B2 * | 5/2008 | Olsson | B65G 21/18 | 198/778 |
| 7,374,392 B2 * | 5/2008 | Biondi | B65G 33/04 | 198/467.1 |
| 7,878,321 B2 * | 2/2011 | Van Faassen | B65G 21/18 | 198/778 |
| 7,886,657 B2 * | 2/2011 | Nothum, Jr. | A21C 9/04 | 99/352 |
| 8,302,763 B2 * | 11/2012 | Broers | B65G 21/18 | 198/778 |
| 8,413,646 B2 * | 4/2013 | Wiker | F24C 14/00 | 126/21 A |
| 8,646,383 B1 * | 2/2014 | Howard | A21B 1/48 | 99/443 C |
| 8,926,463 B1 * | 1/2015 | Eldor | B65G 21/18 | 474/148 |
| 9,161,651 B2 * | 10/2015 | Ros | A21B 1/48 | |
| 9,365,352 B2 * | 6/2016 | Balk | B65G 21/18 | |
| 9,409,715 B2 * | 8/2016 | Balk | B65G 17/30 | |
| 9,504,258 B1 * | 11/2016 | Howard | F24C 15/322 | |
| 2002/0071899 A1 * | 6/2002 | Rainbolt | A23B 4/03 | 426/646 |
| 2002/0162462 A1 * | 11/2002 | Kuenen | A21B 1/48 | 99/479 |
| 2005/0092730 A1 * | 5/2005 | Nothum | A23L 3/361 | 219/388 |
| 2006/0131139 A1 * | 6/2006 | Olsson | B65G 17/10 | 198/849 |
| 2007/0298148 A1 * | 12/2007 | van der Eerden | A21B 1/48 | 426/231 |
| 2008/0308386 A1 * | 12/2008 | Balk | B65G 21/18 | 198/347.1 |
| 2009/0181138 A1 * | 7/2009 | Howard | A23L 5/15 | 426/233 |
| 2009/0260780 A1 * | 10/2009 | Katori | A21D 15/02 | 165/86 |
| 2010/0096243 A1 * | 4/2010 | Balk | B65G 47/52 | 198/457.01 |
| 2011/0084056 A1 * | 4/2011 | Kuenen | A21B 1/42 | 219/388 |
| 2011/0226137 A1 * | 9/2011 | van der Eerden | A21B 1/48 | 99/477 |
| 2011/0247355 A1 * | 10/2011 | McCormick | F25D 13/067 | 62/381 |
| 2011/0259711 A1 * | 10/2011 | Broers | B65G 47/5113 | 198/347.1 |
| 2012/0088019 A1 * | 4/2012 | Bourg, Jr | A47J 37/044 | 426/466 |
| 2013/0000628 A1 * | 1/2013 | Wiker | F24C 14/02 | 126/21 A |
| 2013/0133637 A1 * | 5/2013 | McVeagh | F24C 15/001 | 126/15 R |
| 2013/0220145 A1 * | 8/2013 | Ros | A47J 37/045 | 99/443 C |
| 2014/0037809 A1 * | 2/2014 | Middleton, Jr. | A21B 1/24 | 426/496 |
| 2014/0083309 A1 * | 3/2014 | Reese | B23P 19/04 | 99/474 |
| 2014/0261371 A1 * | 9/2014 | Van Camp | A21B 1/48 | 126/21 A |
| 2015/0079259 A1 * | 3/2015 | Ahmed | F26B 15/04 | 426/523 |
| 2015/0245643 A1 * | 9/2015 | Kop | A21B 1/48 | 426/312 |
| 2015/0342227 A1 * | 12/2015 | Verbruggen | A23B 4/0526 | 426/455 |
| 2015/0353285 A1 * | 12/2015 | Matsuzaki | B65G 21/18 | 198/778 |
| 2015/0367972 A1 * | 12/2015 | Schmidt | B65B 55/027 | 426/531 |

OTHER PUBLICATIONS

International Search Report from PCT Application No. PCT/NL2017/050143, dated May 12, 2017.

\* cited by examiner

CLOSED PROCESSING SYSTEM AND METHOD FOR TREATING ELONGATED FOOD PRODUCTS

The present invention relates to a closed processing system for treating elongated food products. The present invention further relates to a method for treating elongated food products.

In the treatment of elongate food products, and more particularly sausages, there is, depending on the type of product, a need to condition the products. Several examples of conditioning are: drying and heating the products. In the production of larger quantities of food products use is usually made of continuous production lines, wherein the products for conditioning are preferably moved through a determined process space. Used for this purpose according to the prior art are vertically disposed process spaces through which a conveyor belt with products moves in helical manner. The advantage of drying towers is that they can provide a great drying capacity on a limited floor area. On the other hand, the existing drying towers are often less simple to place in a conventional manufacturing area, and they are less advantageous in terms of energy.

In order to provide an improved device for treating elongate food products in a process space with a conditioned airflow an alternative device has been described in International patent application WO 2007/032679 A1, wherein the feed opening and the discharge opening, arranged in the housing for respectively carrying food products into the process space and discharging thereof from the process space, are arranged in opposite and substantially horizontally spaced-apart sides of the housing. Thus, resulting in a device having a compact construction whereby the outer dimension of the device can be limited.

Despite the fact that drying systems, such as the drying towers and the drying device described above, have a great drying capacity, efficiently controlling the climate within such drying system is more difficult. For example, in order to increase the energy efficiency of drying systems, the heated air is re-used again by using return channels for air. By re-using heated air, the climate of the drying device slowly changes per loop of re-used heated air. For example, by re-using heated air, the humidity of the air used in the drying device will slowly increase per loop of re-used air resulting in a more and more less efficient drying process. In order to solve this problem, the drying devices of the prior art are provided with venting means in order to discharge at least a part of used heated air from the drying device.

However, the discharge of used heated air in order to reduce the humidity of the climate of the drying device is undesirable, since the discharge of air result in an energy less efficient process.

The object of the present invention is to provide an improved device for treating elongated food products, while retaining the advantages of the prior art, the elongated food products can be treated in more energy efficient manner.

The present invention provides for this purpose a closed processing system for treating elongated food products, comprising a housing bounding a process space, with a feed opening arranged in the housing and a discharge opening arranged in the housing for respectively carrying elongated food products into the process space and discharging elongated food products from the process space, a transport path for displacing the elongated food products through the process space, at least one airflow generator for generating an airflow in the process space, at least one airflow conditioner for conditioning the generated airflow, and at least one detector for detecting process conditions in the process space. The detected process conditions of the closed processing system of the present invention include at least the relative humidity and wherein the system is arranged to control the process conditions by adjusting the at least one airflow generator and/or at least one airflow conditioner based on the detected relative humidity.

It was found that by providing a closed processing system according to the present invention, the climate of the process space can be controlled without the need of discharging air from the system. Therefore, by defining the airflow speed and the other conditions of the airflow, e.g. the temperature and humidity, based on the detected relative humidity in the process space, the need to discharge air from the system is at least greatly reduced resulting in a more energy efficient system. In fact, by detecting the relative humidity in the process space based on which other parameters of the airflow are controlled, the system of the present invention can be considered a closed system wherein the climate can be kept constant in a controllable manner for a prolonged period of time.

The airflow generator may preferably located downstream of the at least one airflow conditioner. By providing the airflow generator downstream of the airflow conditioner the final speed of the airflow can be better controlled and consequently, the drying process efficiency of the elongated food products is better controlled as well. It is noted that the airflow generator is preferably located upstream of the transport path.

As already stated above, the at least one airflow generator is not only configured to generate an airflow, but is preferably also configured to control the speed of the generated airflow. In this respect, it is noted that the airflow generator not only increases the airflow speed, but may also be configured to decrease the airflow speed in case desired. For example, in case a reduced relative humidity is detected in the process space one could choose to decrease to speed of the airflow to maintain the optimum process climate in the process space.

The at least one airflow conditioner may be configured to control the temperature and/or the humidity of the generated airflow. Besides changing the speed of the airflow based on the relative humidity detected in the process space, the climate of the process space may be controlled by changing the temperature and/or the humidity of the airflow to be supplied to the process space. For this purpose, the airflow conditioner of the present invention may be provided with heating and/or cooling means. For example the heating and/or cooling means may be a heat exchanger unit comprising a conduit for receiving a liquid, such as a coolant, and/or electrical heating means.

Furthermore, the airflow conditioner of the present invention may be provided with moistening means for supplying moisture to the airflow. The moistening means may be in the form of a nozzle connected to a water supply conduit for spraying droplets of water into the airflow.

As already described above, the system of the present invention comprises at least one detector for detecting process conditions in the process space. The detector is configured to detect at least the relative humidity. Preferably, the detector of the present invention is configured to detect the process conditions in the process space continuously. By detecting the process conditions in the process space in a continuous manner, the system of the present invention is able to continuously dynamically control the climate of the process space.

Alternatively, the at least one detector of the present invention is configured to detect the process conditions in the process space at a predefined interval. In order to provide constant climate conditions of the food products to be treated, the predefined interval may equal the time needed to displace a food product through the process space.

In a further embodiment of the present invention, the at least one detector comprises a first sensor and a second sensor, wherein the first sensor is located in the process space nearby the feed opening and the second sensor is located in the process space nearby the discharge opening. By defining a first and second sensor, the detector of the present invention is able to obtain more detailed information about the process conditions at different locations in the process space. Based on the more detailed information, the specific airflow parameters, e.g. airflow speed, temperature and humidity, can be better controlled in order to obtain the desired climate in the process space.

Although the present invention provides a closed processing system wherein venting is not necessarily needed, in an embodiment of the present invention, the system may further comprise at least one air discharge for removing air form the process space. Such air discharge may be useful in case the system is used for treating one type of food product followed by the treatment of another type of food product. Different food products may require different process conditions in the process space. By providing at least one air discharge, the system has the possibility to 'reset' the process conditions of the process space in order to be able to redefine new process conditions.

Also, by providing at least one air discharge, the same system of the present invention may be used for a first treatment of food products followed by a second treatment of food products. By changing the treatment of the food products, inherently, the process conditions in the process space have to be changed as well. Again, it is noted that by providing at least one air discharge in the system of the present invention, the climate of the process space can be changed in a fast and efficient manner.

In an alternative embodiment of the present invention, the system may be provided with at least one air discharge wherein the at least one air discharge comprises a one-way valve. Such one-way valve prevents the entrance of air from outside the system into the system. Such one-way valve is in particular preferred in case the air discharge is used for slightly changing the process conditions of the process space. In case the process conditions have to be changed dramatically, i.e. 'resetting' the process conditions in the process space, the system may be either provided with a two-way valve instead of a one-way valve or the system may be provided with a one-way valve for discharging air from the system in combination with another one-way valve for providing air to the system.

The closed processing system may be any type of system for treating elongated food products. Preferably the closed processing system of the present invention is a drying cabinet.

The present invention provides further a method for treating elongated food products. The method of the present invention comprising the steps of: a) providing elongated food products to be treated; b) carrying the provided elongated food products into the process space of the closed processing system of the present invention; c) generating an airflow in the process space; d) conditioning the generated airflow; and e) discharging the treated elongated food products from the process space. The method of the present invention further comprising the steps of: f) detecting process conditions in the process space; and g) controlling the process conditions in the process space, wherein step f) includes detecting the relative humidity in the process space and wherein the method of the present invention further comprising the step of adjusting the airflow conditions in step g) based on the detected relative humidity in step f).

As already described above, it was found that by detecting the relative humidity and adjusting the airflow conditions based on the detected relative humidity, a method for treating elongated food products can be provided with an increased energy efficiency.

In an embodiment of the present invention, the process conditions are detected continuously. Inherently, the airflow conditions are adjusted continuously as well and therefore providing a method wherein the process conditions are dynamically controlled.

Alternatively, the process conditions are detected at a predefined interval. Inherently, the airflow conditions are adjusted at a predefined interval as well. In order to maintain a constant quality of the food products discharged from the process space, the predefined interval preferably equals the time needed for carrying an elongated food product into the process space and discharging the treated elongated food product from the process space.

In a further embodiment of the method of the present invention, the airflow speed may be adjusted in step g) based on the detected relative humidity in step f). Alternatively, or in combination with adjusting the airflow speed, the airflow temperature and/or the airflow humidity may be adjusted in step g) based on the detected relative humidity in step f).

In an embodiment of the present invention, the speed of the generated airflow may be about [1, 7.5] m/s. Preferably, the speed of the generated airflow may be about [3, 7.3] m/s, more preferred about [5, 7] m/s. Optimum results may be obtained with a generated airflow having a speed of about 6.5 m/s.

The temperature of the generated airflow may preferably be about [40, 120]° C. Preferably, the temperature of the generated airflow may be about [50, 110]° C., more preferred about [60, 100]° C. or [70, 90]° C.

In another embodiment of the present invention, the humidity of the generated airflow may be about [4, 32] g/kg (grams of water per kilogram air). Preferably, the humidity of the generated airflow may be about [5, 28] g/kg, more preferably [6, 24] g/kg, [7, 20] g/kg, [8, 16] g/kg or [9, 12] g/kg.

The invention claimed is:

1. A processing system for treating elongated food products, the processing system arranged to be closed such that a climate is maintained constant in a controllable manner for a prolonged period of time, the processing system comprising:
   a housing bounding a process space, with a feed opening arranged in the housing and a discharge opening arranged in the housing for respectively carrying elongated food products into the process space and discharging elongated food products from the process space;
   a transport path for displacing the elongated food products through the process space;
   at least one airflow generator for generating an airflow in the process space when the processing system is closed;
   at least one airflow conditioner for conditioning the generated airflow when the processing system is closed; and
   at least one detector for detecting process conditions in the process space when the processing system is closed, wherein the detected process conditions include at least relative humidity as the processing system is closed to venting during which the processing system is arranged to control the process conditions by adjusting the at least one airflow generator and/or at least one airflow conditioner based on a detection of the relative humidity;

wherein venting of the processing system is provided by at least one air discharge opening including; a first one-way valve for regulating air from outside the processing system for entrance into the processing system;

wherein the system further comprises a second one-way valve for removing air from the process space.

2. The system according to claim 1, wherein the at least one airflow generator is located downstream of the at least one airflow conditioner and wherein the at least one airflow generator is located upstream of the transport path.

3. The system according to claim 1, wherein the at least one airflow generator is configured to control the speed of the generated airflow.

4. The system according to claim 1, wherein the at least one airflow conditioner is configured to control the temperature and/or the humidity of the generated airflow.

5. The system according to claim 1, wherein the at least one detector is configured to detect the process conditions in the process space continuously.

6. The system according to claim 1, wherein the at least one detector is configured to detect the process conditions in the process space at a predefined interval.

7. The system according to claim 6, wherein the predefined interval equals the time needed to displace an elongated food product through the process space.

8. The system according to claim 1, wherein the at least one detector comprises a first sensor and a second sensor, wherein the first sensor is located in the process space nearby the feed opening and the second sensor is located in the process space nearby the at least one discharge opening.

9. The system according to claim 1, wherein the closed processing system is a drying cabinet.

10. The system according to claim 1, wherein the at least one airflow conditioner is provided with a nozzle connected to a water supply conduit for spraying droplets of water into the airflow.

11. The system according to claim 1, wherein the at least one airflow conditioner is provided with a heat exchanger unit comprising a conduit for receiving a coolant and/or electrical heating means.

12. A processing system for treating elongated food products, the processing system arranged to be closed such that a climate of the processing system is maintained constant in a controllable manner for a prolonged period of time, the processing system comprising:

a housing bounding a process space, with a feed opening arranged in the housing and a discharge opening arranged in the housing for respectively carrying elongated food products into the process space and discharging elongated food products from the process space;

a transport path for displacing the elongated food products through the process space;

at least one airflow generator for generating an airflow in the process space when the processing system is closed;

at least one airflow conditioner for conditioning the generated airflow when the processing system is closed; and at least one detector for detecting process conditions in the process space when the processing system is closed, wherein the detected process conditions include at least relative humidity as the processing system is closed to venting during which the processing system is arranged to control the process conditions by adjusting the at least one airflow generator and/or at least one airflow conditioner based on a detection of the relative humidity;

wherein venting of the processing system is provided by at least one air discharge opening including a valve for regulating air from outside the processing system for entrance into the processing system or air for discharge from the processing system to outside the processing system;

wherein the at least one airflow generator is located downstream of the at least one airflow conditioner and wherein the at least one airflow generator is located upstream of the transport path;

wherein the at least one airflow generator is configured to control the speed of the generated airflow;

wherein the at least one airflow conditioner is configured to control the temperature and/or the humidity of the generated airflow;

wherein the at least one detector comprises a first sensor and a second sensor, wherein the first sensor is located in the process space nearby the feed opening and the second sensor is located in the process space nearby the at least one discharge opening;

wherein the system further comprises a first one-way valve for removing air from the process space.

* * * * *